Oct. 14, 1952     R. H. YOUNG     2,613,893
AIRFOIL CONSTRUCTION
Filed April 1, 1948
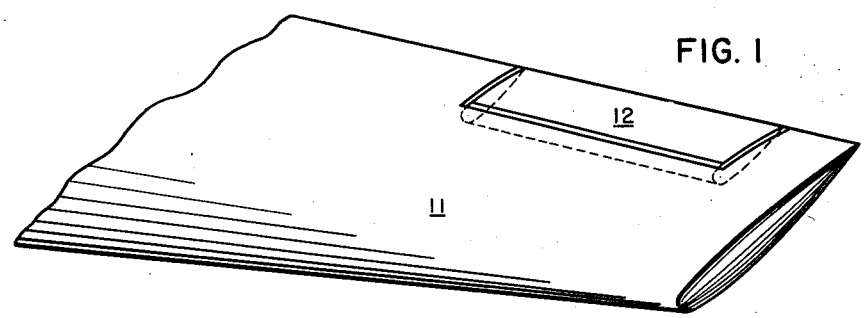
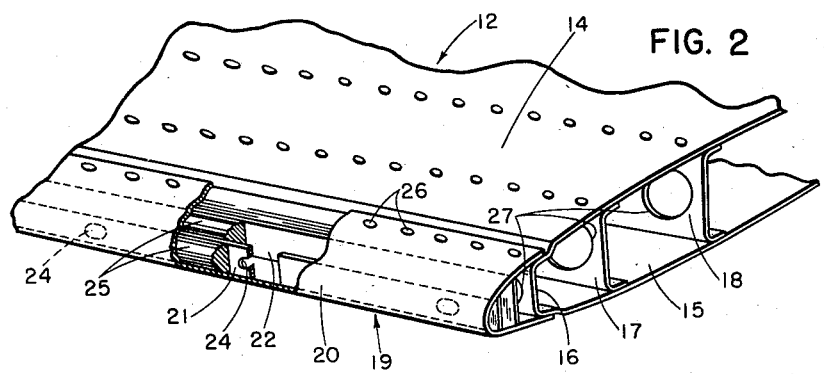
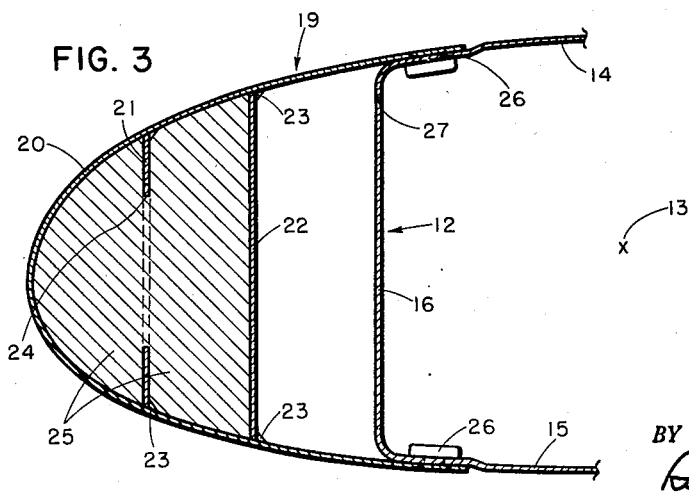
INVENTOR.
RICHARD H. YOUNG
BY
Richard W. Treverton
ATTORNEY.

Patented Oct. 14, 1952

2,613,893

UNITED STATES PATENT OFFICE 2,613,893

AIRFOIL CONSTRUCTION

Richard Hall Young, Columbus, Ohio, assignor to Curtiss-Wright Corporation, a corporation of Delaware Application April 1, 1948, Serial No. 18,450

2 Claims. (Cl. 244—123)

The present invention relates to aircraft control airfoils and particularly to an improved structure for providing mass balance in such airfoils.

The desired balance of control airfoils, such as ailerons, elevators and tabs, is often obtained by securing within them, usually in the nose portions thereof, masses of lead or like high density metal. Usually such a mass is provided for causing the air foil to be in static balance about the axis of its hinge connection to the airframe, although in some cases a mass is chosen which will produce a desired degree of overbalance either fore or aft of the hinge axis.

Difficulty has been encountered with balance masses of lead and similar soft metals by reason of the metal creeping or deforming under load and thereby loosening upon the fasteners which connect the masses to the airfoil. Furthermore such fasteners ordinarily cannot be secured directly to the leading edge of the airfoil but must be secured to internal structure that is closer to the airfoil hinge axis. Hence the mass of such fasteners, from the standpoint of balance effect, is inefficiently utilized. Further, the attaching of the lead masses by conventional means has been time-consuming and in many instances the necessity of such attachment has required airfoil structural design and steps of assembly which are disadvantageous from the standpoints of weight and cost.

The present invention has as its primary object an improved mass balance airfoil construction which will obviate the foregoing difficulties, which will provide secure anchorage of the balancing mass in the airfoil leading edge, and which will secure maximum utilization of the mass from the standpoints of both structural strength and balancing effect.

The manner in which the foregoing objectives and advantages are achieved will become apparent from the following description of the typical embodiment shown in the accompanying drawings, wherein:

Figure 1 is a perspective view of the tip portion of an aircraft wing having an aileron constructed in accordance with the invention;

Figure 2 is a fragmentary perspective view of the aileron, with certain parts broken away to show the internal leading edge structure; and, Figure 3 is a cross-section of the aileron leading edge drawn to a larger scale.

As shown in the drawings the aircraft wing 11 has an aileron 12 hinged to the trailing edge portion thereof, the axis of the hinge connection being indicated at 13 in Figure 3. The body of the aileron in this instance comprises a single sheet of metal formed to provide upper and lower skin surfaces 14 and 15 and a connecting upright portion 16 having openings through which access may be had to the airfoil interior. The internal structure of the aileron body may comprise spars 17 and 18 to which skin sections 14 and 15 are secured by rivets, welding or any other suitable fastening means, and, if desired, may additionally or alternately comprise ribs (not shown) extending transversely of the aileron's span.

Secured to the leading edge of the aileron body is a nose cap 19 comprising an outer shell 20 which preferably is formed of sheet steel. Extending spanwise of the aileron between the upper and lower walls of the shell, and in spaced relation to each other and to the forward tip of the shell, are strips 21 and 22. These strips also are preferably of sheet steel and they are secured to the cap at their upper and lower edges in any suitable manner, as by welds 23. The forward strip, 21, is provided with spaced holes 24 for anchoring a mass 25 of high density metal which fills the space within the nose cap forward of strip 22. The high density metal is poured into the cap in a molten condition, the pouring operation being easily performed with the cap, functioning as the side walls of a mold, standing on end on a flat surface which constitutes the bottom wall of the mold.

Various low melting point metals may be used for the mass 25, but when the sheet steel parts 20, 21 and 22 are provided with an electroplated protective coating of cadmium the mass 25 advantageously comprises a lead-bismuth alloy of approximately 88% lead and 12% bismuth by weight. This alloy can be poured at a temperature of approximately 535° F. which does not damage the cadmium coating or produce any appreciable warping of the plated sheet steel. Furthermore the mass of this alloy adheres to the surrounding sheet metal mold, and it does not shrink and become loose therein as a lead mass has been found to do.

According to one method of fabricating the airfoil, the body including the parts 14, 15, 16 and internal reinforcements 17 and 18 may be completed and thereafter the completed nose cap, having the mass 24 molded therein, may be attached by fastening means 26. These advantageously comprise screws cooperating with nut plates that are secured to the airfoil body so that the nose cap can be readily detached for providing access to the airfoil interior through lightening and access openings 27. By another method of fabricating the airfoil 12 the nose cap having the mass 24 molded therein may have the section 14, 15, 16 secured thereto by fasteners 26, which in this case may be rivets. Thereafter the airfoil body may be completed by fabrication into the section 14, 15, 16 of the internal reinforcements such as 17 and 18. From these examples it will be readily apparent to those skilled in the art that various different methods may be employed to assemble airfoils utilizing the mass balance arrangement of this invention.

It will be seen that the balance mass 25 is disposed as far forwardly of the hinge axis 13 of the airfoils as is possible, thereby providing the maximum balance effect for a given mass. The mass 25 by conforming closely to the nose portion of the shell 20 appreciably strengthens the latter, particularly against forces tending to collapse the shell. The strips 21 and 22, in addition to their functions as walls of a mold for confining the mass 25 when poured, and thereafter of supporting the mass 25, cooperate with the mass 25 in its action of reinforcing the shell. It will thus be seen that by this invention the weight of the mass 25 and of strips 21 and 22 is efficiently utilized from the standpoints of both balance effect and of structural strength.

While the airfoil 12 has been referred to as an aileron it will be understood that it may be any other kind of aircraft surface that is to be provided with a balance mass. For example the airfoil 11 may be considered to be a stabilizer and airfoil 12 an elevator or rudder hinged to the stabilizer; or airfoil 11 may be considered to be a primary control surface such as an aileron, rudder or elevator and 12 a tab that is hinged to such primary control surface.

It will also be understood that various modifications may be made in the structure of the airfoil without departing from the spirit of the invention or invention will be apparent to those skilled in the art and may be employed from the scope of the appended claims.

I claim as my invention:

1. An airfoil whose leading edge portion comprises a sheet metal shell of substantially arched formation in cross-section, a sheet metal strip extending spanwise along the interior of the shell, said strip bridging said arch formation and having its side edge portions substantially throughout their length secured to the shell, the forward face of the strip and the interior surface of the shell forward of the strip defining a continuous ductiform mold cavity, and an integral mass of metal cast in and substantially conforming in shape to said mold cavity, said shell and strip being coated with cadmium, and the metal of said integral mass being lead-bismuth alloy comprising approximately seven parts lead and one part of bismuth by weight.

2. An airfoil body and a detachable nose cap therefor, said cap comrising a sheet metal shell member of substantially arched formation in cross-section, the edge portions of the shell being rearwardly directed and being connected detachably to the forward portion of said body to provide access to the interior of the body, a sheet metal strip member extending spanwise along the interior of the shell, said strip member bridging said arch formation and having its side edge portions substantially throughout their length secured to the shell member, the forward face of the strip and the interior surface of the shell forward of the strip defining a continuous ductiform mold cavity, an integral mass of metal cast in and substantially conforming in shape to said mold cavity, said shell and strip being coated with cadmium and the metal of the mass being a lead-bismuth alloy comprising approximately seven parts lead and one part bismuth by weight, and means projecting from one of said members and having portions embedded in said mass of metal in interlocked relation therewith.

RICHARD HALL YOUNG.

REFERENCES CITED

The following references are of record in the file of this patent:

UNITED STATES PATENTS

| Number | Name | Date |
|---|---|---|
| 312,485 | Makin | Feb. 17, 1885 |
| 1,302,947 | Martin | May 6, 1919 |
| 1,907,635 | Winters | May 9, 1933 |
| 2,460,351 | Hoffman | Feb. 1, 1949 |

FOREIGN PATENTS

| Number | Country | Date |
|---|---|---|
| 253,920 | Great Britain | Mar. 10, 1927 |